June 18, 1940.  L. K. DAVIS  2,204,792
MOVEMENT PRODUCING DEVICE
Filed Feb. 6, 1937  2 Sheets-Sheet 1
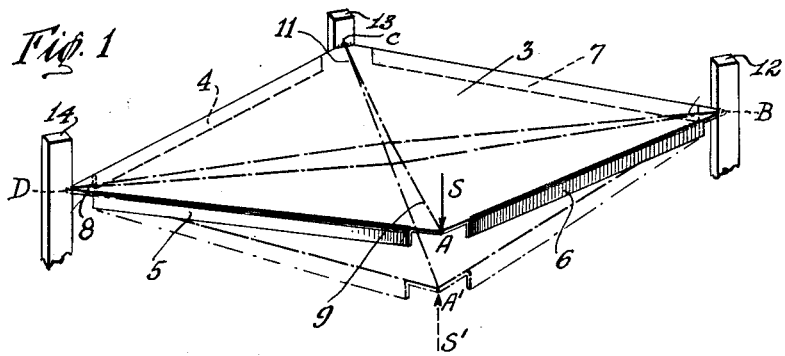
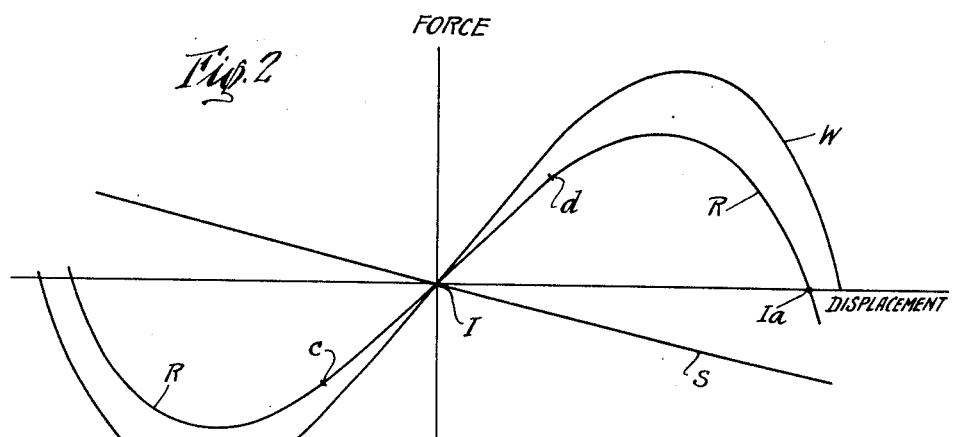
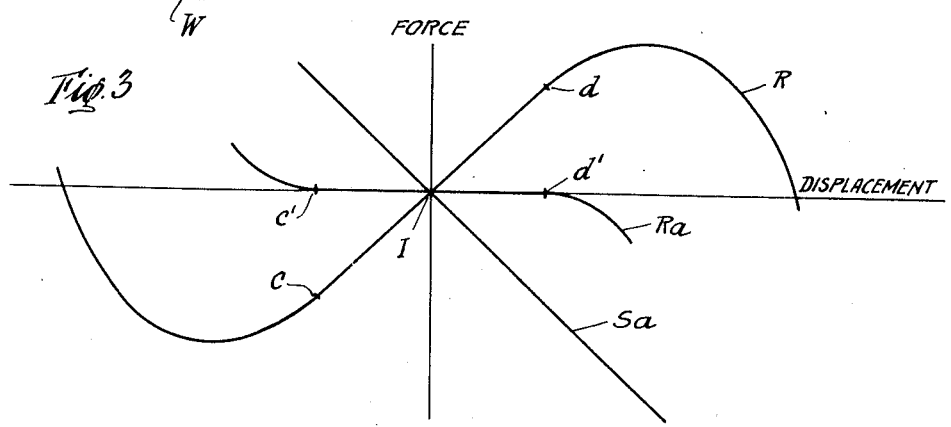
INVENTOR
Lincoln K. Davis
BY
Albert M. Austin
ATTORNEY INVENTOR
Lincoln K. Davis
BY
Albert M. Austin
ATTORNEY Patented June 18, 1940

2,204,792

UNITED STATES PATENT OFFICE 2,204,792

MOVEMENT PRODUCING DEVICE

Lincoln K. Davis, Brockton, Mass.

Application February 6, 1937, Serial No. 124,370

6 Claims. (Cl. 267—1)

This invention relates to movement producing devices and, more particularly, to over-centering devices adapted to operate upon application of forces external thereto.

An over-centering device is understood to be a mechanism which can be caused to assume a shape in which it is in a position of unstable equilibrium, such that any departure from that position releases forces tending to cause a greater departure, or a negative restoring movement. In a spring device, on the other hand, displacement from stable or zero position sets up forces tending to cause less departure or a positive restoring movement.

According to one form of the invention, a flat warpable sheet or plate may be provided having three corners secured to the base with the other corner free to move. Such a warpable sheet may be stressed to exert over-centering action. Additional spring force may be applied to such sheet in order to give the combined structure various modified actions.

For example, the external spring action and over-centering action may be so combined as to permit moving the free corner of the plate throughout a given range without requiring any force to overcome elasticity. Or, if desired, the inherent snap action of the plate may be balanced by its inherent spring action, requiring no external spring action, in which case the flexible portions of the sheet will act as pivots whose stiffness is neutralized.

In other cases, the spring and over-centering forces may be so applied and combined as to obtain a weakened snap action or weakened spring action. Or, if desired, the spring and over-centering forces may be combined to obtain a spring action which exhibits constant resistance to movement over a given range of displacement.

The above effects may be obtained both by symmetrical stressing of the warpable plate and by unsymmetrical stressing. The plate may be formed of one piece or it may be built up from a plurality of initially separate elements (fabricated).

As illustrative of a device to which spring forces may be applied readily to produce the results which are the basis of the invention, I have chosen the hyperbolic paraboloidal structure which is disclosed in my copending application Serial No. 15,033, filed April 6, 1935, now Patent 2,166,238 granted July 18, 1939.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a perspective view of a hyperbolic paraboloidal device to which the principles of this invention may be applied;

Figs. 2, 3, 4, 5 and 6 illustrate the interaction of the forces existing in and applied to the device of Fig. 1 under varying conditions;

Figure 4:
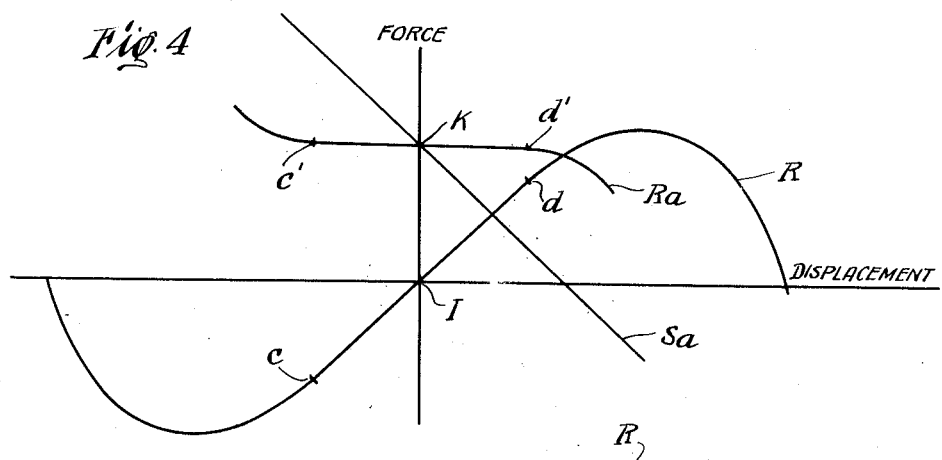

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

The structure of Fig. 1 comprises an initially flat sheet or plate 3 of rectangular outline, the corners of which are A, B, C and D. The plate may be made of any suitable resilient single material having stable spring qualities, such as steel, phosphor bronze, etc. Although the plate may be perforate, as disclosed in the application referred to above, it is here shown imperforate for the sake of simplicity of illustration. The periphery of plate 3, or at least a part of it, is stretched relative to the center portions, as for example, by hammering at the corners 8, 9, 10 and 11, and parts of the edges are then stiffened by folding at right angles, as indicated at 4, 5, 6 and 7, leaving the corner portions 8, 9, 10 and 11 not so stiffened. The stretching of the periphery of plate 3 relative to the center portions places the center within the frame in tension.

Plate 3 is thus left flexible along the diagonals

AC and BD, and the center portions are under tension relative to the periphery, which causes the plate to warp out of flatness into either of two opposite stable hyperbolic paraboloidal figures, in which the diagonals AC and BD are curved in opposite directions. In the shape shown in full lines in Fig. 1, diagonal AC is concave upward, and diagonal BD is concave downward; in the shape shown in dotted lines, diagonal AC is concave downward and diagonal BD is concave upward. Between these two shapes, plate 3 has a position of unstable equilibrium, which occurs when it is flat, provided the internal stressing is symmetrical, which it is in the general case. The flat position is not indicated to avoid confusion.

The corners B, C and D of plate 3 are firmly held in a fixed plane by suitable supports, indicated diagrammatically by 12, 13 and 14, respectively, corner A being left unsupported and thus free to move laterally to this plane in response to forces applied to or existent in the structure. A force applied to the free corner A and acting at right angles to the plane of the corners B, C and D is indicated by S, which may be a spring operating between a fixed point and corner A, or it may represent the leaf-spring action of the flexible portions 8, 9, 10 and 11 of plate 3, or a combination of the two. In either case, the magnitude of S is zero when plate 3 is flat, and it reverses its direction when plate 3 passes through flatness, so that it is always directed toward the position occupied by corner A when the plate is flat. S has the characteristics of a plain coil or leaf-spring in that the magnitude of the force exerted by it is proportional to the distortion. S' indicates the direction of force S when plate 3 is warped into the shape shown in dotted lines, in which A has taken the position A'.

Referring to Figs. 2, 3 and 4, the forces above the displacement axis are those upward in Fig. 1; those below, downward. The displacements to the right of the force axis are those upward in Fig. 1; those to the left, downward.

Considering Fig. 2, W represents an idealized force displacement characteristic curve of an over-centering mechanism, such as that of Fig. 1, in which the material is considered to be infinitely flexible or without stiffness, the diagonals then acting as free and frictionless pivots. In practice, the material has a certain stiffness which introduces a leaf-spring action in opposition to the warping tendency, and this stiffness is represented by S. The curves W and S combine to form a resultant R which shows the actual practical warping characteristics of such a mechanism.

As the origin I in the graph of Fig. 2 represents zero displacement and zero displacing force, it corresponds to the position of unstable equilibrium of the plate 3, or flatness of the latter where it is stressed (stretched) symmetrically. Thus the warping curve W passes through this point, and since, as stated above, the force S is zero when the plate 3 is flat, curve S of Fig. 2 also passes through the origin I, so that the resultant R must also pass through the same point. As a displacement upward takes place, curve R is followed and the displacing force builds up rapidly to a maximum in an upward direction. Further movement results in a falling off of the upward force as the internal warp-producing stresses of plate 3 become exhausted, until this upward force becomes zero, at point Ia, and further upward movement stops. The displacement is now a maximum in an upward direction and the force produced by plate 3 at corner A is zero. Since force must now be applied externally to cause plate 3 to move out of this position, the latter is a position of stability.

In a similar manner, the force downward increases rapidly with the displacement at first, until a maximum downward force is reached, beyond which it falls off and reaches zero again when the downward displacement is a maximum, when plate 3 is in another position of stability. Since the displacing forces adjacent to the origin I increase with the displacement, plate 3 follows curve R with an accelerated motion or snap action on either side of the origin I.

It is evident that since the magnitude of the restoring forces resulting from the stiffness of the material of which the plate is made determines the slope of the curve S, it also determines the slope of the substantially straight portion of the resultant R between points $c$ and $d$, when curves W and S are combined to form curve R. For any given conditions and stressing of plate 3 a certain resultant R will exist. The stiffness is a factor inherent in the material of which the plate 3 is made, and is dependent on its composition, proportions, hardness, etc., and the stressing of plate 3 is not conveniently nor accurately subject to alteration after its initial introduction. Therefore, in order to provide a ready means of controlling the resultant R, it is desirable to supply an adjustable variable external force in such a manner that it will cooperate with the inherent stiffness in determining the character of the resultant R. The application and effect of such a force will now be considered.

In Fig. 3, R represents the resultant derived in Fig. 2, which is the actual warping curve of plate 3, in which its stiffness enters as a factor. The curve R is not theoretical, but is taken from measurement of a working model of the hyperbolic paraboloidal structure. It will be noted that the portion of R between the points $c$ and $d$ is substantially straight, as pointed out previously; this portion constitutes the useful part of curve R. If a spring force indicated by $Sa$ is applied in opposition to R, this force having a rectilinear characteristic, the new resultant $Ra$ must have a corresponding straight portion, and if the slope of $Sa$ is equal and opposite to the slope of R between points $c$ and $d$, then $Ra$ will have a portion, between points $c'$ and $d'$, which lies on or parallel to the displacement axis. If $Sa$ and R both pass through the origin, as shown in Fig. 3, or pass through the same point on the displacement axis, the straight portion of $Ra$ between points $c'$ and $d'$ will coincide with the latter, which means that the corner A, barring the effect of gravity, will "float" or remain in any position in which it is placed corresponding to that portion of $Ra$, and any force, however small, will be sufficient to move it to a new position. The straight portion of $Ra$ thus will indicate neither over-centering action nor spring action.

If desired, the same effect may be achieved by initially introducing warp-producing stresses just sufficient to overcome the stiffness of the material of which plate 3 is made. To explain, the warp-producing stresses, represented by W of Fig. 2, may be introduced in such a degree that the straight portion of W will have a slope precisely equal to that of S, so that the portion of the resultant between $c$ and $d$ will coincide with the displacement axis, to give the "floating" action referred to above. If R, $Sa$, and $Ra$ of Fig. 3 are considered, for the moment, to represent W, S and R of Fig. 2, respectively, this situation is illustrated graphically. However it is more convenient to over-warp plate 3, or introduce warping stresses which overbalance the stiffness, as shown in Fig. 2, and then to introduce an opposing spring action represented by Sa of Figs. 3–6, inclusive, to give a resultant of the desired slope, whether or not this slope is zero.

It will be apparent that if Sa is of less slope than the straight portion of R, the straight portion of the resultant Ra will slope upward to the right, thus indicating the same characteristics as those shown by curve R, i. e., over-centering or snap action.

If Sa is of greater slope than the straight portion of R, the straight part of the resultant Ra will slope downward to the right and so indicate simple spring action.

It will be seen that a proper choice of the force whose curve is Sa will make it possible to give the resultant R the characteristics of either over-centering or spring action, in any degree desired, or neither, as in the first case.

If either Sa or R of Fig. 3 does not pass through the origin of the graph, it is evident that the resultant Ra cannot. Referring now to Fig. 4, which is lettered to correspond to Fig. 3, it will be seen that Sa does not pass through the origin. In other words, Sa here represents the force S of Fig. 1 adjusted so that it is not zero when the plate 3 is flat, whereas it is zero in the first case considered. In this instance S is assumed to exert a force in an upward direction (in Fig. 1) when plate 3 is flat, and no force when plate 3 is warped to a certain degree in an upward direction (also in Fig. 1), as interpretation of Fig. 4 indicates. If the slope of Sa is equal and opposite to that of the straight portion of R, the resultant Ra will have a straight portion parallel to the displacement axis, meaning that a constant force, represented by the ordinate of any point of this straight portion of Ra, will maintain the corner A of plate 3 in any position in which it is placed within the limits determined by the extent of the straight portion of Ra.

Figure 5:
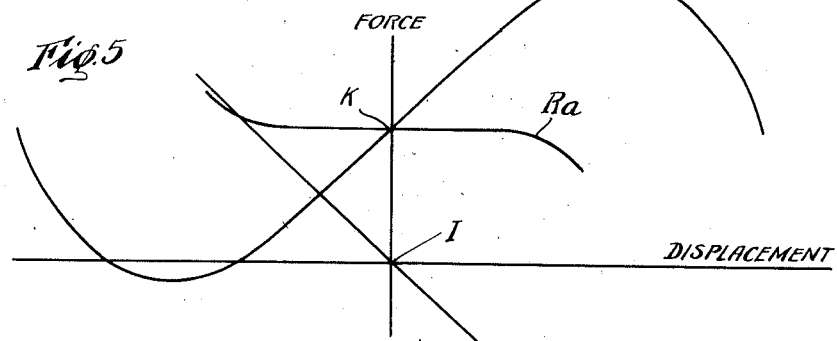

Referring to Fig. 5, the same effect may be achieved if plate 3 is unsymmetrically stressed in such a manner that its position of unstable equilibrium occurs when it is warped out of flatness to a certain degree. For example, assume that curve R passes through point K on the force axis, and that Sa passes through the origin I. It will be evident that the resultant Ra here will be unchanged. Furthermore, it will be apparent that if plate 3 is stressed just sufficiently to overcome the stiffness of the material of which it is made, as pointed out in connection with Fig. 3, but unsymmetrically, the resultant Ra in this case too may be caused to lie parallel to the displacement axis.

Figure 6:
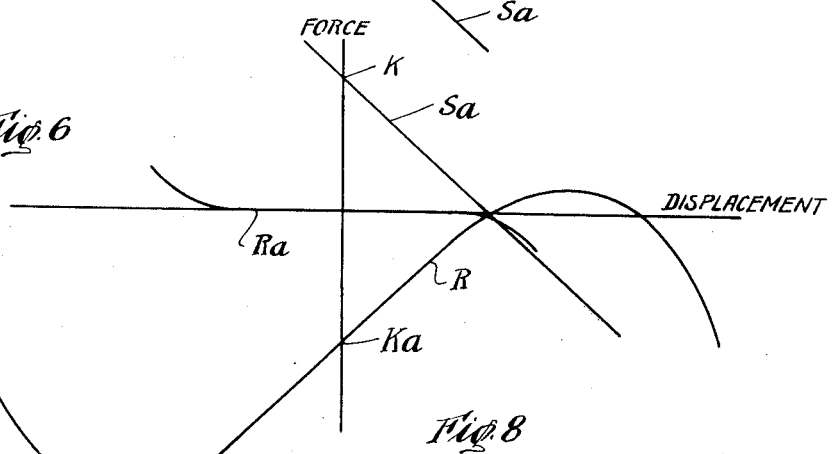

Referring to Fig. 6, unsymmetrical stressing may be employed to duplicate the effect shown in Fig. 3, in which the resultant Ra coincides with the displacement axis through a certain distance. For instance, if curve R of Fig. 4 does not pass through the origin I, but intersects the force axis in a point Ka as far below the displacement axis as the point K is above it, the resultant Ra will fall on the displacement axis, as in Fig. 3.

However, it is preferable that the stressing be symmetrical in any case, and that the forces producing any unsymmetry of the resultant be introduced independently, as they are then more accurately known and subject to adjustment or alteration.

It will be seen that this principle of opposing over-centering action with spring action may be applied to any type of device which exhibits over-centering or snap action, and it is not to be construed as limited to the hyperbolic paraboloidal plate or frame structure, which has been chosen for illustrative purposes only. It is thought that the principle has been explained in detail sufficiently complete to enable anyone skilled in the art to apply it to other mechanisms having the proper characteristics. Among these may be a non-developable snap-acting disk, an arched resilient bar or sheet operating between relatively fixed supports, a system of levers or arms suitably jointed, etc., whether or not these are responsive to changes in the surrounding medium, as they may be in certain cases, such as if made of composite material, etc., and it is intended to include these in the scope of the invention. The principle is of particular application in sensitive control or indicating devices or other mechanisms in which it is desired to avoid the use of pivots, bearings, etc., in the interests of ruggedness and simplicity, or for the purpose of simulating or neutralizing the effect of gravity, springs, etc., at the same time permitting motion of a member with a freedom of action and lack of resistance to motion not ordinarily found in mechanisms in which flexure of resilient parts is necessary. A special application of this principle to a device having a control element is to be found in my copending application Serial No. 124,371, filed together with this one.

Figure 7:
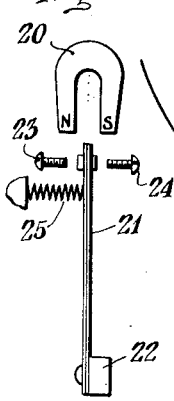
Fig. 7 illustrates diagrammatically a form of thermostat to which the principles of the invention may be applied.

Referring now to Fig. 7, a thermostat is shown, to which some of the above principles may be applied. A strip of ordinary bimetal, such as is commonly used in thermostats, has a certain stiffness which tends to limit the sensitivity to temperature change, as this stiffness is always present and is in opposition to the forces caused by the temperature change. If this stiffness could be reduced or neutralized, the forces caused by the changes in temperature, not being opposed as before, would produce a greater movement of the strip, or the movable portion of it. Thus, the degree of movement produced with the stiffness present would be produced by a lesser change in temperature if the stiffness were absent, so that the sensitivity would be increased.

The thermostat, as shown in Fig. 7, comprises a bimetallic strip 21 fixedly anchored to a support 22. The bimetallic strip 21 may be of the usual construction except that one or both of the elements must be magnetizable, or else a suitable magnetizable armature must be attached. For example, the bimetallic strip may comprise a sheet of steel welded throughout its entire extent to a sheet of brass. The bimetallic strip carries its usual contact cooperating with stationary contact screws 23 and 24.

For applying over-centering action to the bimetallic strip, a permanent horseshoe magnet 20 having its north and south poles on opposite sides of the bimetallic strip is provided. A helical spring 25 may be provided to supplement the inherent spring action of the bimetallic strip 21. The spring 25 may be adjusted to be under no stress when the bimetallic strip 21 is in the central position shown.

It will be seen that at a certain temperature the bimetallic strip 21 may be in perfect equilibrium in its mid-position. In this position, the strip 21 is under no inherent bending stress due to its leaf-spring action. It this position, the forces exerted by the north and south poles of the permanent magnet 20 are equal. If the bimetallic strip is displaced from the position of equilibrium, the magnet 20 will act on it with a displacing force against the inherent spring force of the bimetallic strip itself and against the force of spring 25.

Figure 8:
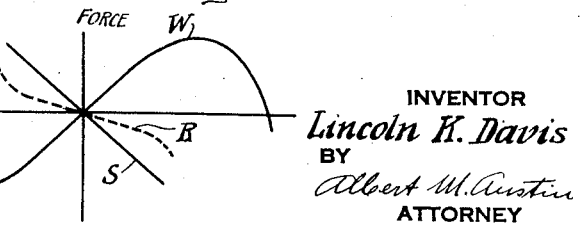
Fig. 8 is a diagram illustrating one manner of applying these principles to the thermostat of Fig. 7.

Referring to Fig. 8, curve W is the force-displacement curve due to the action of the permanent magnet; curve S is the force-displacement curve due to the combined action of spring 25 and the stiffness of strip 21. The resultant R is obtained by combining the curves W and S. As will be seen, the value of S and W are so chosen as to give the bimetallic strip a resultant weak spring action. Thus, the stiffness of strip 21 is effectively reduced, giving increased sensitivity.

If desired, the forces could be so adjusted as to give snap action or any of the other effects described above in connection with the other figures. It will also be understood that spring 25 may be omitted and the stiffness of strip 21 used for the sole spring action in which case curve S will represent the stiffness of bimetallic strip 21.

The above diagrams have been worked out on the basis of present knowledge of mechanical stresses occurring in the several parts and are accurate so far as present understanding is concerned. However, the stresses and strains set up in the several parts are quite complicated and for this reason the diagrams may not be absolutely correct. It should therefore be borne in mind that these diagrams are given solely to assist in an understanding of the invention and are not to be taken in any limiting sense.

While certain novel features of the invention have been disclosed and are pointed out in the annexed claims, it will be understood that various omissions, substitutions and changes may be made by those skilled in the art without departing from the spirit of the invention.

What is claimed is:

1. In a device of the character described, a frame-like member comprising a frame having interconnected relatively stiff portions permitting relative angular movement therebetween, means connected to said relatively stiff portions for providing tension between said relatively stiff portions to obtain overcentering action, means operatively connected to said frame-like member for providing spring action between said relatively stiff portions, the forces due to said spring and overcentering actions being of such value and combining to give a resultant resistance to displacement of said relatively stiff portions which is of substantially constant value throughout a given range of relative displacement of said relatively stiff portions.

2. A device according to claim 1 in which said resultant is of finite value.

3. A device according to claim 1 in which the value of said resultant is zero, whereby said member exhibits limpness.

4. In a device of the character described, a frame-like sheet metal member comprising a frame having four relatively stiff portions and relatively flexible junctions between said relatively stiff portions, and an interior portion under tension connecting said relatively stiff portions to cause overcentering action, said junction supplying spring action, the forces due to said spring and overcentering actions individually changing with angular displacement of said stiff portions with respect to each other, said forces being of such value and combining to provide a resultant resistance to relative displacement of said relatively stiff portions which is of substantially constant value throughout a given range of said displacement.

5. A device according to claim 4 in which said resultant is of finite value.

6. A device according to claim 4 in which the value of said resultant is zero, whereby said member exhibits limpness.

LINCOLN K. DAVIS.